US007672552B2

(12) United States Patent
Leuchs et al.

(10) Patent No.: US 7,672,552 B2
(45) Date of Patent: Mar. 2, 2010

(54) ACHIEVING GAUSSIAN OUTPUTS FROM LARGE-MODE-AREA-HIGHER-ORDER MODE FIBERS

(75) Inventors: Gerd Leuchs, Wiesenthau (DE); Norbert Lindlein, Furth (DE); Siddharth Ramachandran, Hoboken, NJ (US)

(73) Assignee: Furukawa Electric North America, Inc., Norcross, GA (US)

( * ) Notice: Subject to any disclaimer, the term of this patent is extended or adjusted under 35 U.S.C. 154(b) by 201 days.

(21) Appl. No.: 12/043,345

(22) Filed: Mar. 6, 2008

(65) Prior Publication Data

US 2008/0219620 A1 Sep. 11, 2008

Related U.S. Application Data

(60) Provisional application No. 60/893,398, filed on Mar. 7, 2007.

(51) Int. Cl.
*G02B 6/32* (2006.01)

(52) U.S. Cl. .............................. 385/33; 385/15; 385/31

(58) Field of Classification Search .................. 385/15, 385/31, 33
See application file for complete search history.

(56) References Cited

U.S. PATENT DOCUMENTS 7,049,579 B2 * 5/2006 Ozkan et al. ................ 250/251

* cited by examiner

*Primary Examiner*—Jennifer Doan

(57) ABSTRACT

A mode conversion technique to convert higher-order-mode into a nearly fundamental Gaussian shape by using a beam expander is developed and is particularly useful in high-power lasers and amplifiers. By using a beam expander between a transmitted fiber and a conventional mode conversion system, the strict lateral tolerance requirement can be overcome with high conversion efficiency.

21 Claims, 15 Drawing Sheets

ACHIEVING GAUSSIAN OUTPUTS FROM LARGE-MODE-AREA-HIGHER-ORDER MODE FIBERS

CROSS REFERENCE TO RELATED APPLICATIONS

This application claims the benefit of U.S. provisional patent application Ser. No. 60/893,398, filed Mar. 7, 2007, having the title "Achieving Gaussian Outputs from Large-Mode-Area Higher-Order-Mode Fibers," which is incorporated herein by reference in its entirety.

TECHNICAL FIELD

The present invention relates to optical fibers, and more particularly to mode conversion of optical fiber modes.

BACKGROUND OF THE INVENTION

Higher order modes (HOM) in specially designed fibers have recently shown to offer means to obtain robust light propagation in record-large effective areas ($A_{eff}$) with negligible mode-coupling or bend distortions. Such beams can be generated with greater than 99% coupling-efficiencies using in-fiber gratings. However, this conversion technique may not be suitable at an output of a high-power fiber-laser or amplifier comprising a HOM fiber because converting back to a (small-$A_{eff}$) fundamental mode of a fiber would lead to high intensities at the fiber output. This could then lead to nonlinear distortions and dielectric breakdown which is the very phenomena one would try to avoid by using HOM fibers.

In view of such phenomena, there exists a need to convert HOM beams by using different conversion techniques for high power applications.

BRIEF DESCRIPTION OF THE DRAWINGS

Referring now to the drawings.

DETAILED DESCRIPTION

Figure 1A:
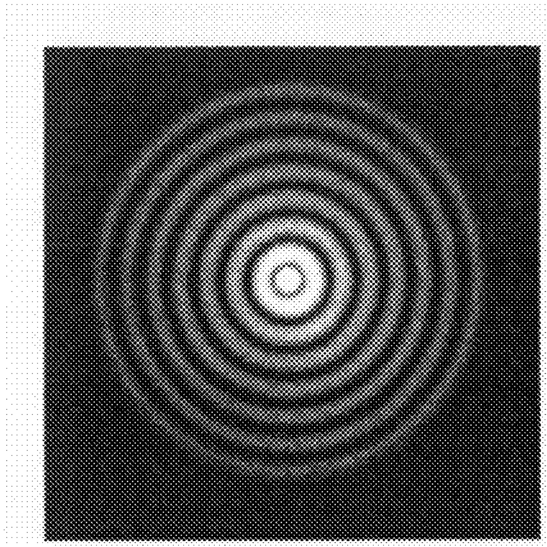
FIGS. 1*a* and 1*b* show experimental results of intensity distributions in a near (FIG. 1*a*) and in a far field (FIG. 1*b*) of an $LP_{08}$ mode (LP stands for Linearly Polarized, m is the radial mode number)

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications and equivalents. Alternative to in-fiber gratings as noted above, the present invention describes free-space techniques to convert the output of a higher order modes (HOM) fiber into a fundamental Gaussian beam, because ultimately, for most applications of high-power lasers and amplifiers, a Gaussian output would be desired.

Note that although the laser beam quality values ($M^2$) of HOMs are very high, the output comprises a single, spatially coherent mode/beam. This implies that the HOM can be collimated or otherwise relayed through a series of lenses from the tip of the fiber to some desired location in free space. Hence, the mode converter may be deployed farther downstream, and even at the physical location where the focusing is implemented. Indeed, one can envisage a complex "leasing system" for HOM beams where the optical device at any desired location both converts the beam into a Gaussian and subsequently focuses it.

There are different methods to convert higher order beams into (nearly) fundamental mode beams as described in U.S. Pat. Nos. 6,377,726 and 6,404,951. Especially, the use of binary phase plates to correct the phase of the side lobes of the higher order beam, so that they can interfere positively, is well-known. However, it is also well-known that a binary phase plate alone cannot improve the laser beam quality. The reason is that there are in the far field besides a small central maximum, which looks nearly like a fundamental mode, also some secondary maxima quite far away from the center. Nevertheless, in several cases it might be more useful to remove some of these secondary maxima by losing some light power, if on the other side the factor $M^2$ is then decreased to the value of a nearly fundamental Gaussian mode. (i.e. $M^2 \approx 1$)

Figure 1C:
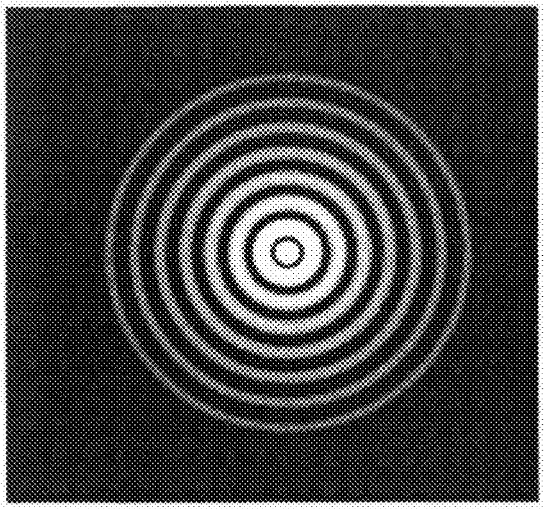
FIGS. 1*c* and 1*d* show the corresponding simulated data which were obtained from a model using experimentally fitted data.
Figure 1B:
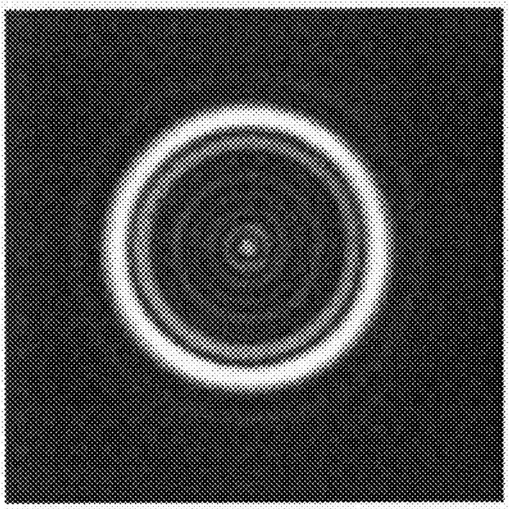
Figure 1D:
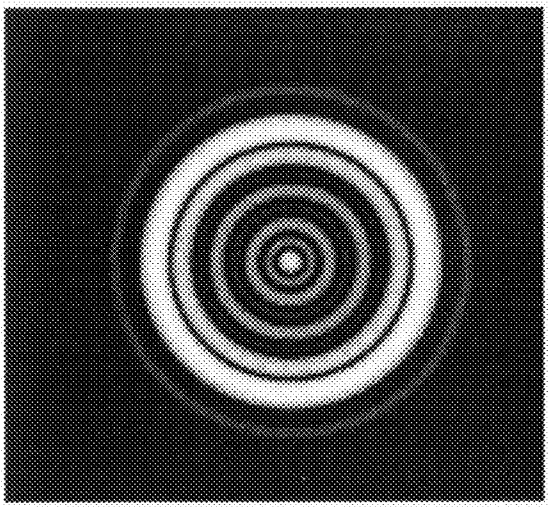

Examples of higher order fiber modes which are regarded in this present invention are described in S. Ramachandran et al. "Light propagation with ultra-large modal areas in optical fibers," Opt. Lett. 31, 1797-1799 (2006) which is incorporated herein by reference in its entirety. They are named $LP_{0m}$ modes (LP stands for Linearly Polarized, in is the radial mode number) and are in the near field quite similar to Bessel beams which are truncated in the radial direction. It is well-known that Bessel beams contain in each ring the same amount of light power. Therefore, it is very important that the light of all rings will positively interfere in the far field. However, the regarded modes are not ideal Bessel beams, but show some small deviations and are truncated. This can also be seen by looking at the far field. An ideal Bessel beam would form a single ring in the far field, whereas in the case of the $LP_{0m}$ modes there are besides a bright ring also some darker rings. FIGS. 1*a* and 1*b* show experimental results of the intensity distribution in the near (FIG. 1*a*) and in the far field (FIG. 1*b*) of a $LP_{08}$ mode, and FIGS. 1*c* and 1*d* show the corresponding simulated data which were obtained from a model using experimentally fitted data. In the comparison, it should be taken into account that the intensity I was measured with an infrared sensitive Vidicon camera which is extremely non-linear. Therefore, the simulated results are displayed by applying a γ-correction with here γ=0.5 for the intensity I, i.e. the quantity $I^{0.5}=\sqrt{I}$ is displayed in the simulations.

A Bessel beam has many zeros of the intensity and at each of these zeros the complex amplitude or electric field changes sign and therefore the phase jumps by π. It is well-known that a binary phase plate which just corrects these phase jumps of π, so that there is in the near field behind the phase plate a uniform phase, can form a quite narrow and high intensity maximum in the far field.

To be sure that this is one of the optimum solutions an iterative Fourier transform algorithm was used, where first the complex amplitude in the far field is calculated, then the intensity in the far field is set to the desired value, i.e. a Gaussian intensity distribution, by keeping the phase as it is, and afterwards this new complex amplitude is propagated back to the near field of the fiber. There, the intensity is again set to the intensity of the $LP_{0m}$ mode by keeping the phase, and the next iteration can start. The result is that after a few iterations the phase in the near field of the fiber converges to a constant phase value. This is equivalent to the solution with a binary phase plate, which corrects the original phase jumps of π, so that in the end there is a constant phase behind the phase plate.

In order to correct the phase jumps at a wavelength λ and a refractive index n of the phase plate, the depth d of the binary levels of the phase plate should be $d=\lambda/(2(n-1))$ and the concentric rings of the phase plate should start and end at the zeros of the intensity distribution of the respective $LP_{0m}$ mode. The table below shows the radii of the zeros of the intensity for the case of a $LP_{08}$ mode at λ=1080 nm.

| | | | | | | | |
|---|---|---|---|---|---|---|---|
| Radius/μm | 2.980 | 8.281 | 13.723 | 19.175 | 24.630 | 30.087 | 35.544 |

Figure 2:
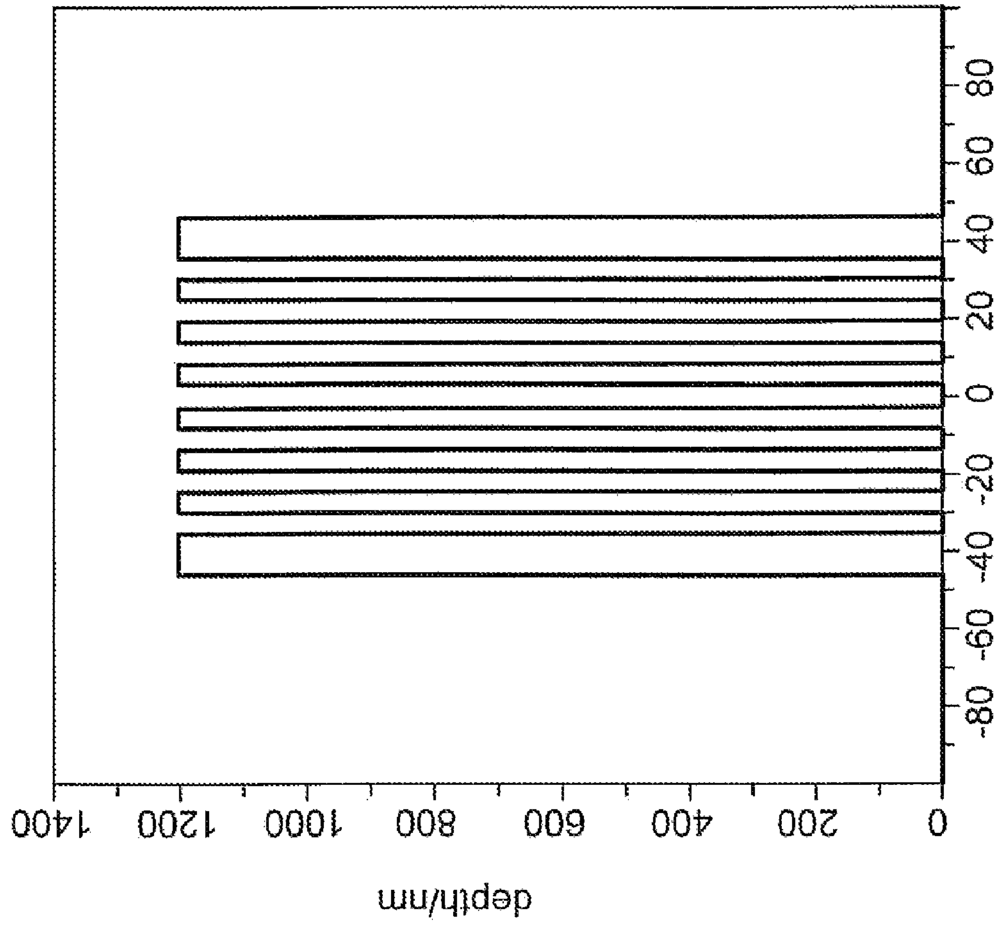
FIG. 2 shows a central cross section of a phase plate made of fused silica for converting an $LP_{08}$ mode at 1080 nm wavelength into a Gaussian mode.

These radii are also the radii of the phase transition points of the phase plate if the phase plate is directly mounted at the fiber end. If there is an additional imaging system between fiber end and phase plate to magnify the mode, the radii of the phase plate are just the product of the scaling factor of the imaging system and the radii of the zeros of the intensity of the mode. A cross-section of a phase plate (made of fused silica with a refractive index of n=1.4495 at λ=1080 nm) for converting a $LP_{08}$ mode at λ=1080 nm into a Gaussian mode is shown in FIG. 2.

Figure 3B:
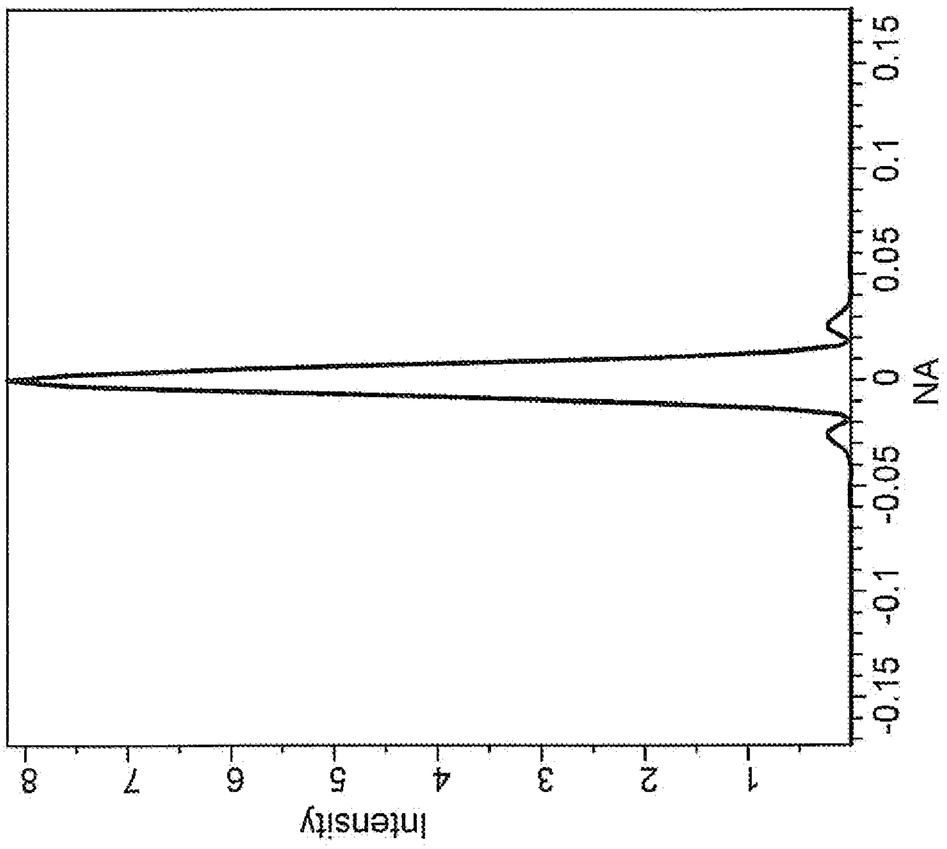
FIGS. 3*a* and 3*b* are intensity distributions of an $LP_{02}$ mode at $\lambda$=1080 nm in a near field and a far field, respectively.
Figure 3A:
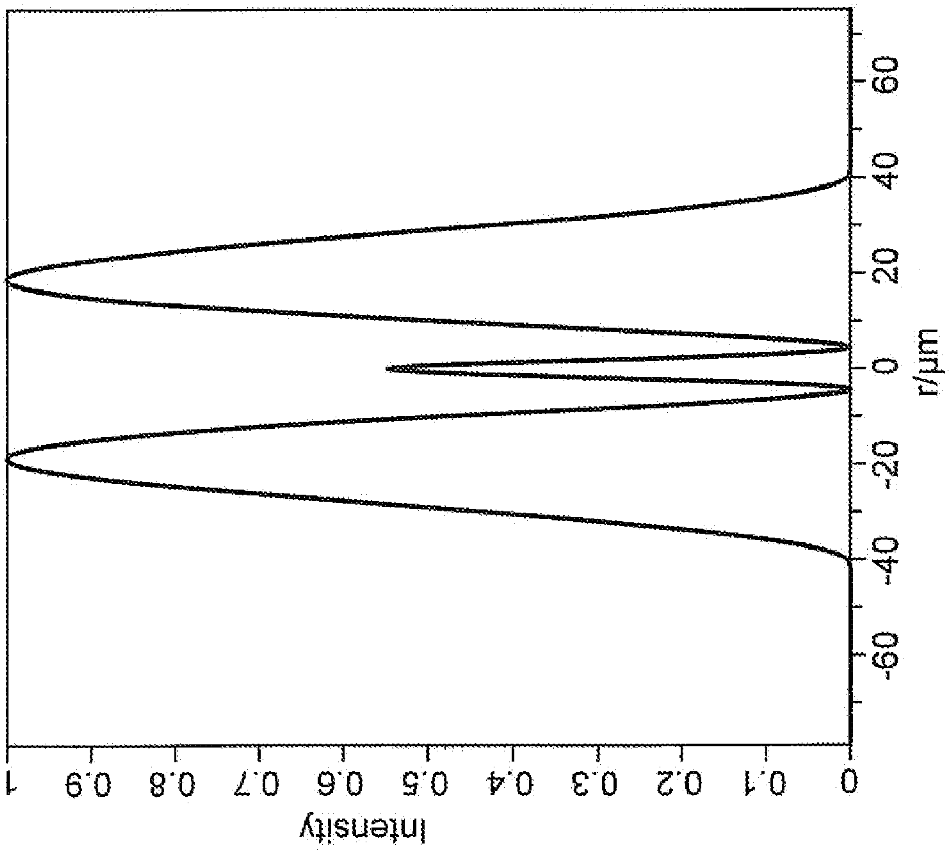

In the following, the intensity distributions I(r) in the near and in the far field of some $LP_{0m}$ modes will be shown, whereby for the switching between near and far field the well-known Fraunhofer diffraction integral is used which is numerically implemented by using a Fast Fourier Transformation. The near field data which are the basic data for the simulations coincide very well with experimental results. The field of complex amplitudes which is used for the simulation has 2048×2048 samples with a diameter of 0.4 mm, although the intensity in the near field is only different from zero in a central region of less than 100 μm. So, the sampling in the Fourier domain will also be quite dense and aliasing effects are avoided due to the still high number of samples in the central region. For the graphical display only the central part of the intensity is shown. FIGS. 3*a* and 3*b* show the near field (FIG. 3*a*) and the far field (FIG. 3*b*) of a $LP_{02}$ mode of a fiber designed for a wavelength of λ=1080 nm. The beam quality factor $M^2$ is calculated numerically from the intensity distribution in the near field I(x, y) and the intensity distribution in the far field $\tilde{I}(\theta_x,\theta_y)$, where $\theta_x$ and $\theta_y$ are direction cosines. For small values, the direction cosines are nearly identical to the angles in the far field.

It is:

$$M_x^2 = \frac{4\pi}{\lambda}\sigma_x\sigma_{\theta x} \text{ with } \sigma_x^2 = \frac{\int_{-\infty}^{+\infty}\int_{-\infty}^{+\infty} x^2 I(x, y)\,dx\,dy}{\int_{-\infty}^{+\infty}\int_{-\infty}^{+\infty} I(x, y)\,dx\,dy} \quad (1)$$

$$\text{and } \sigma_{\theta x}^2 = \frac{\int_{-\infty}^{+\infty}\int_{-\infty}^{+\infty} \theta_x^2 \tilde{I}(\theta_x, \theta_y)\,d\theta_x\,d\theta_y}{\int_{-\infty}^{+\infty}\int_{-\infty}^{+\infty} \tilde{I}(\theta_x, \theta_y)\,d\theta_x\,d\theta_y}$$

Analogous equations are valid in the y-direction. Because of the rotational symmetry of our problem, we can just take one of the values $M^2:=M_x^2=M_y^2$.

The $LP_{02}$ mode of FIGS. 3*a* and 3*b* has a numerical value of $M^2=2.03$.

Please note that in the following figures the intensity distributions of the original modes in the near field are always normalized to a maximum value of 1. The intensity distributions in the far field are displayed as functions of the sine of the far field angle which is in the figures abbreviated as "NA" (numerical aperture). Additionally, the values of the intensity in the far field are of course definitely connected to the near field intensity values, although the values as such have arbitrary units. So, it is possible to compare the values of the near field intensities of each mode before and after filtering, and the values of the far field intensities with and without phase plate. But, it is not directly possible to compare the intensity values in the near and far field crosswise.

Figure 4:
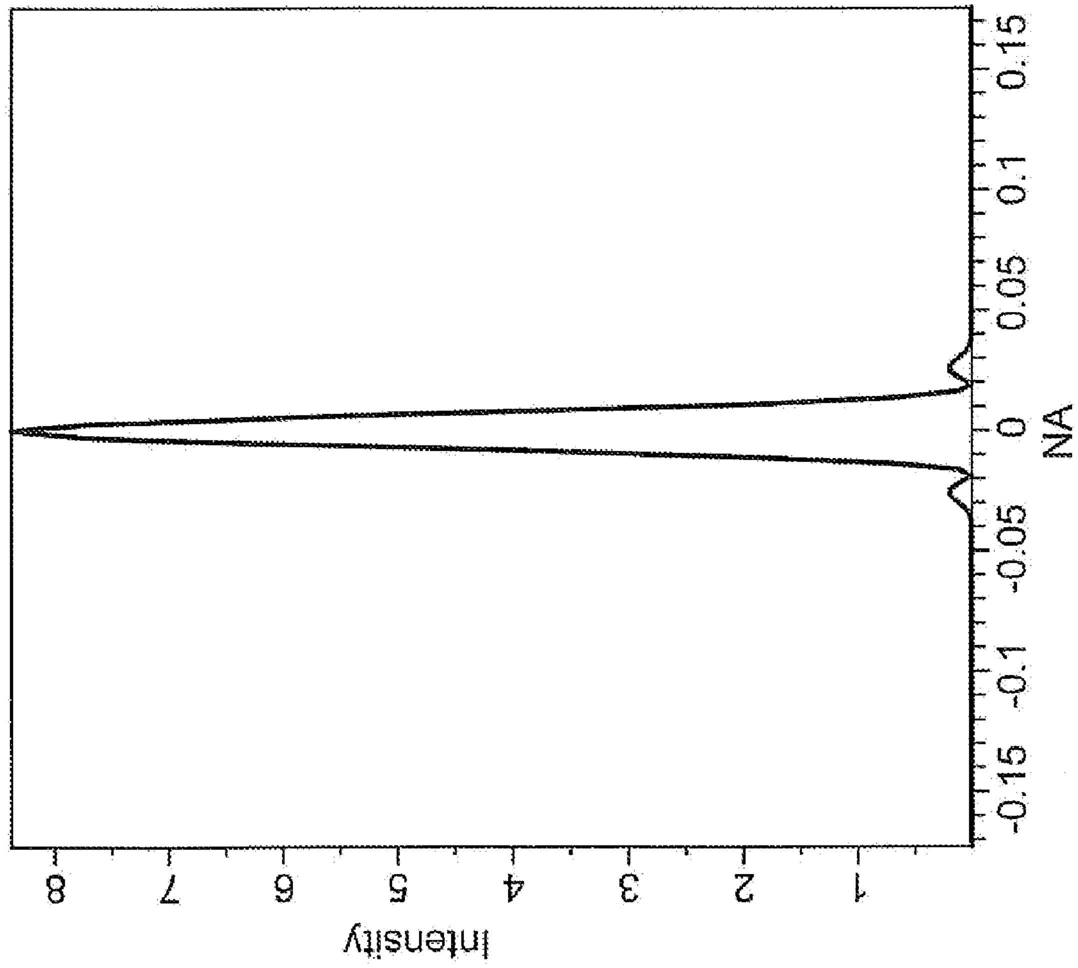
FIG. 4 is a far field intensity distribution of an $LP_{02}$ mode at $\lambda$=1080 nm with a phase plate immediately behind a fiber.
Figure 5:
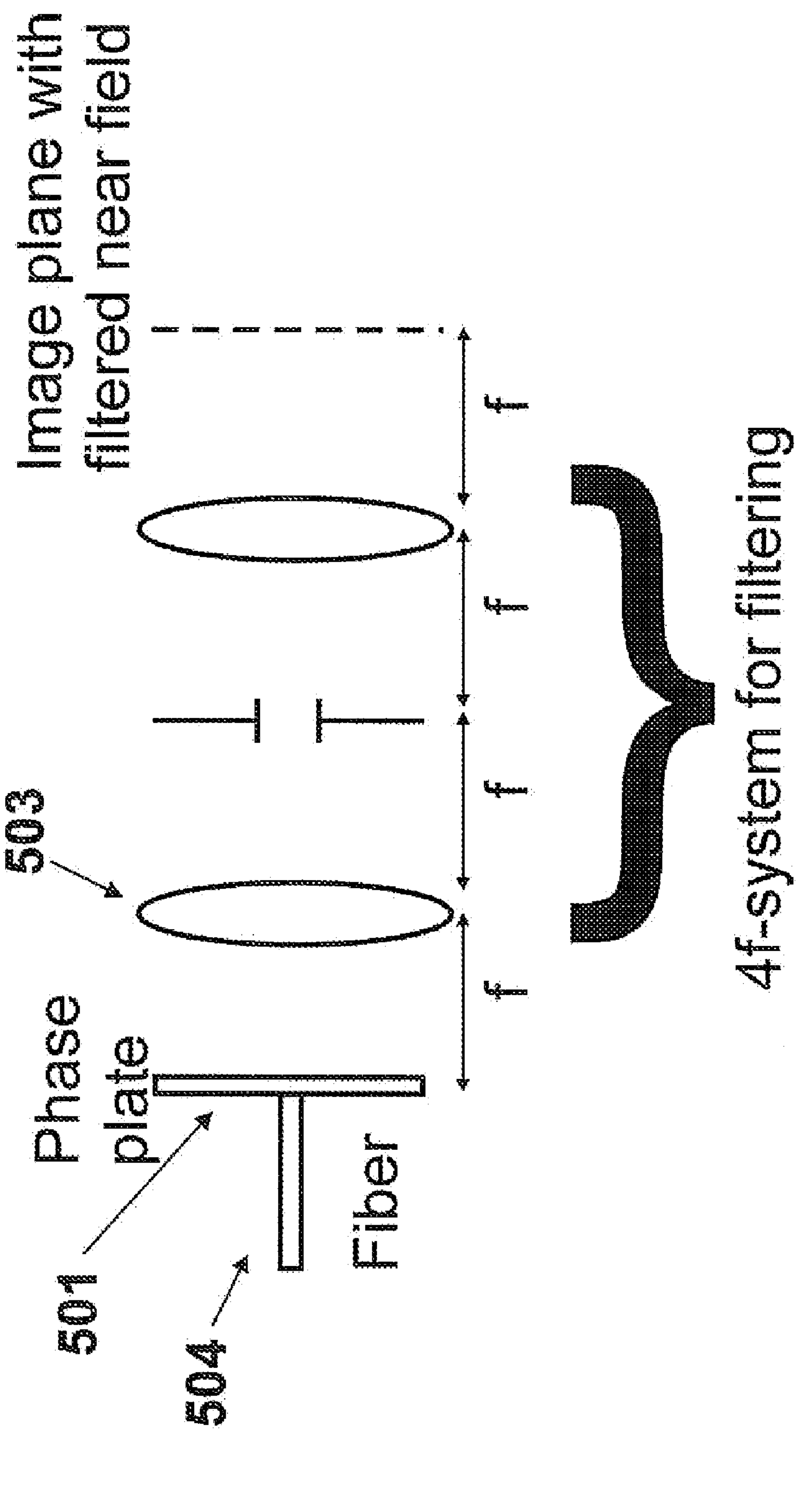
FIG. 5 is a typical free space mode conversion system including a telescope for optical filtering.

By introducing a phase plate immediately behind the fiber end, the far field intensity distribution of FIG. 4 results. In this special case of a $LP_{02}$ mode, where most of the light is in a ring with identical phase (see FIG. 3*a*), the phase plate does not change a lot and the far field distribution in FIGS. 3*b* and 4 is nearly identical. Both figures show, that there are outside of the high central peak some secondary maxima which contain due to the large area of the rings about 13.5% of the total light power. By blocking the light of these side lobes the $M^2$ value can be decreased. Optically, this means that behind a fiber 504 with a phase plate 501 a 4f-telescope system 500 is introduced and a stop in the focal plane of a first lens 503 of the 4f-telescope system 500 allows filtering the "far field" intensity distribution as described in FIG. 5.

Figure 6A:
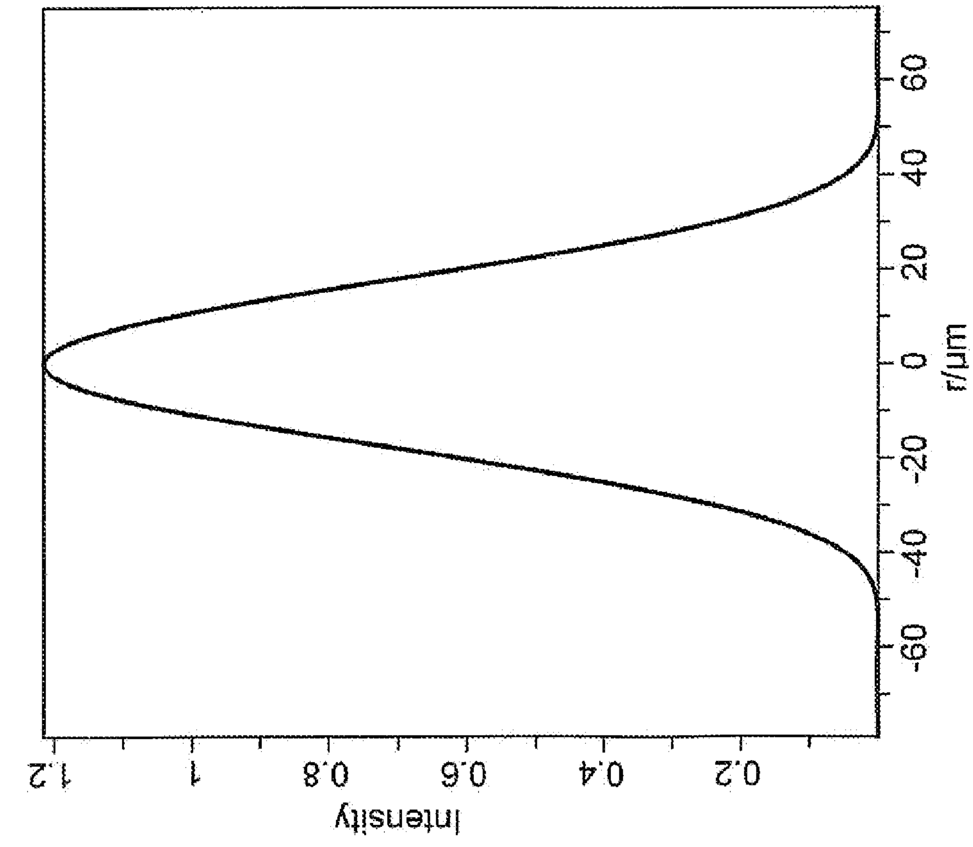
FIGS. 6*a* and 6*b* are intensity distributions of a converted $LP_{02}$ mode at $\lambda$=1080 nm in a near field and a far field, respectively, after using a phase plate with an optical filtering system.
Figure 6B:
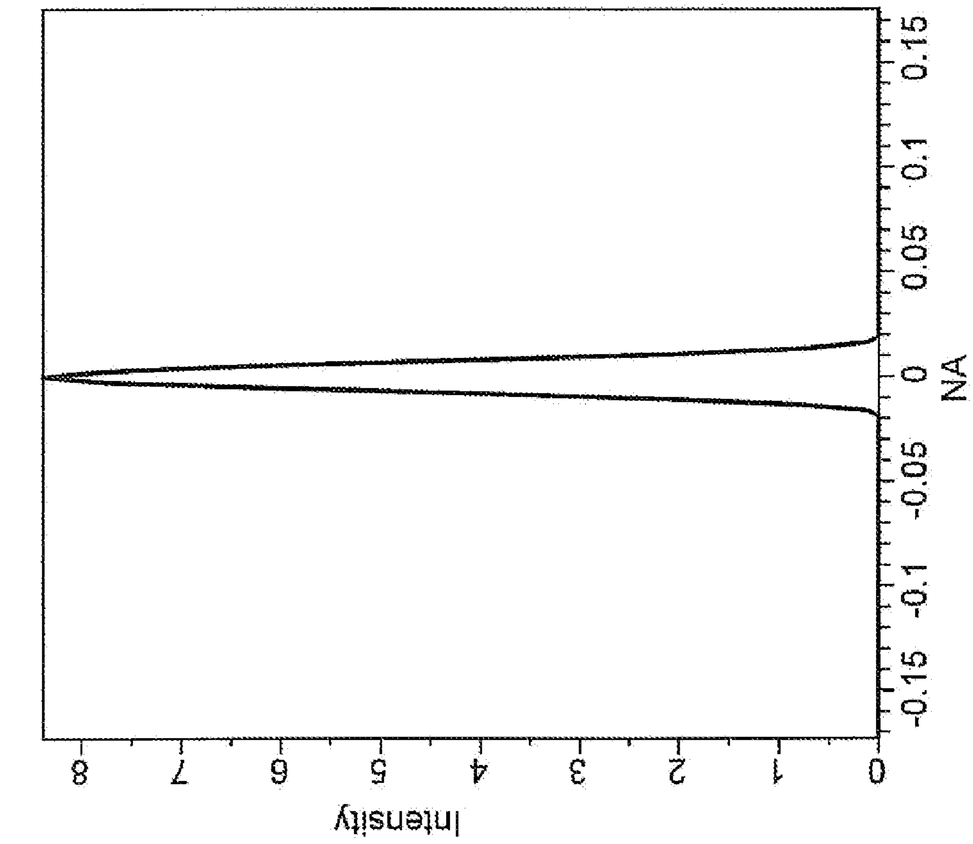

FIGS. 6*a* and 6*b* show the near (FIG. 6*a*) and the far field (FIG. 6*b*) of the converted $LP_{02}$ mode after passing the phase plate and the optical filtering system, respectively. The stop in the filtering system was adjusted to a radius corresponding to a far field angle of 0.019 rad. The far field in FIG. 6*b* is of course identical to that of FIG. 4 if the side lobes are truncated. In this converted and filtered beam there are 86.5% of the total light power of the original $LP_{02}$ mode (losses due to reflections at optical surfaces are not taken into account) and the beam quality factor is $M^2$=1.07. So, the $M^2$ factor is nearly that of an ideal Gaussian beam by only losing about 13.5% of the light power.

Whereby in this special case of the $LP_{02}$ mode the phase plate did not have much influence, the phase plate is desirable for higher order modes. Therefore, the same simulations were also done for all modes up to a $LP_{08}$ mode at λ=1080 nm and the important parameters of these simulations are shown in a table below.

| | Mode | | | | | | |
|---|---|---|---|---|---|---|---|
| | $LP_{02}$ | $LP_{03}$ | $LP_{04}$ | $LP_{05}$ | $LP_{06}$ | $LP_{07}$ | $LP_{08}$ |
| | Original beam | | | | | | |
| $M^2$ | 2.03 | 4.31 | 6.41 | 8.40 | 10.31 | 12.17 | 13.99 |
| $A_{eff}$ (μm²) | 3249 | 2847 | 2658 | 2475 | 2264 | 2024 | 1776 |
| | Beam with phase plate (but without filtering) | | | | | | |
| $M^2$ | 2.03 | 4.30 | 6.38 | 8.36 | 10.24 | 12.06 | 13.86 |
| | Beam wit phase plate and filtering | | | | | | |
| $M^2$ | 1.07 | 1.05 | 1.04 | 1.04 | 1.04 | 1.04 | 1.04 |
| $P/P_0$ | 86.5% | 77.7% | 76.6% | 76.2% | 75.9% | 75.6% | 75.3% |
| $A_{eff}$ (μm²) | 3210 | 3420 | 3422 | 3413 | 3406 | 3405 | 3413 |

In this table, there are also given conversion ratios of the total light power ($P/P_0$) and the effective area ($A_{eff}$) of the fiber modes in the near field, which is defined as:

$$A_{eff} = \frac{\left(\int\int I dA\right)^2}{\int\int I^2 dA} \quad (2)$$

There, I is the intensity in the near field and the integrals (or numerically sums) are made over the whole fiber area.

Figure 9B:
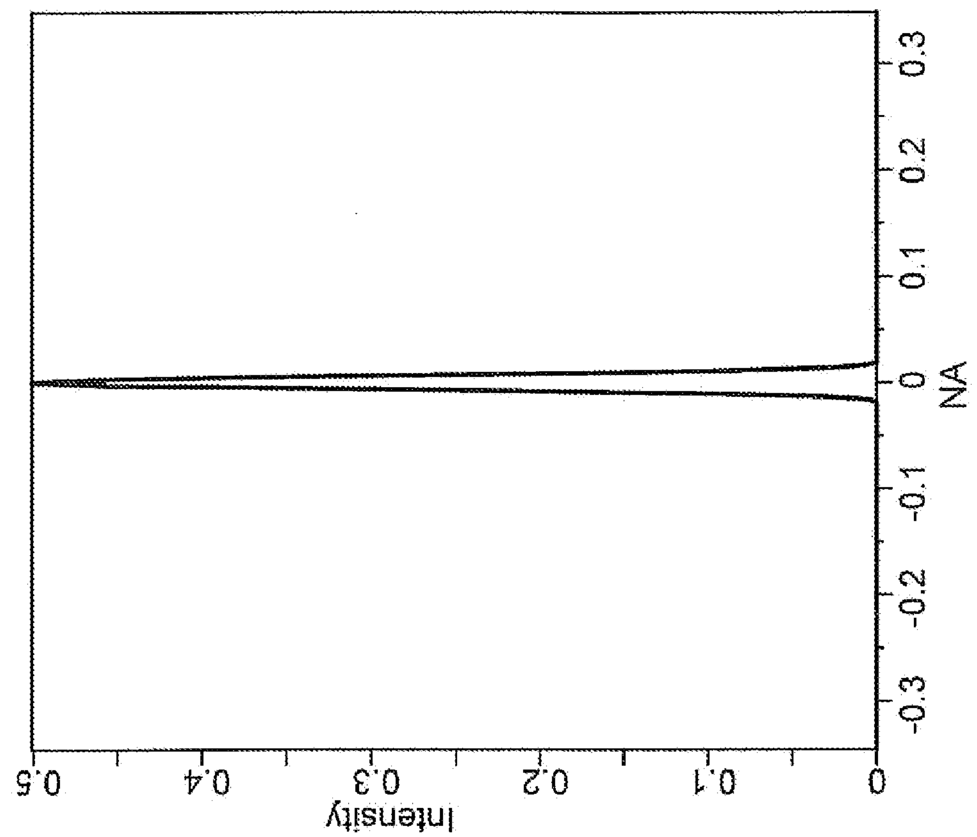
FIGS. 9*a* and 9*b* are intensity distributions of a converted $LP_{08}$ mode at $\lambda$=1080 nm in a near field and a far field, respectively, after using a phase plate plus an optical filtering system.
Figure 9A:
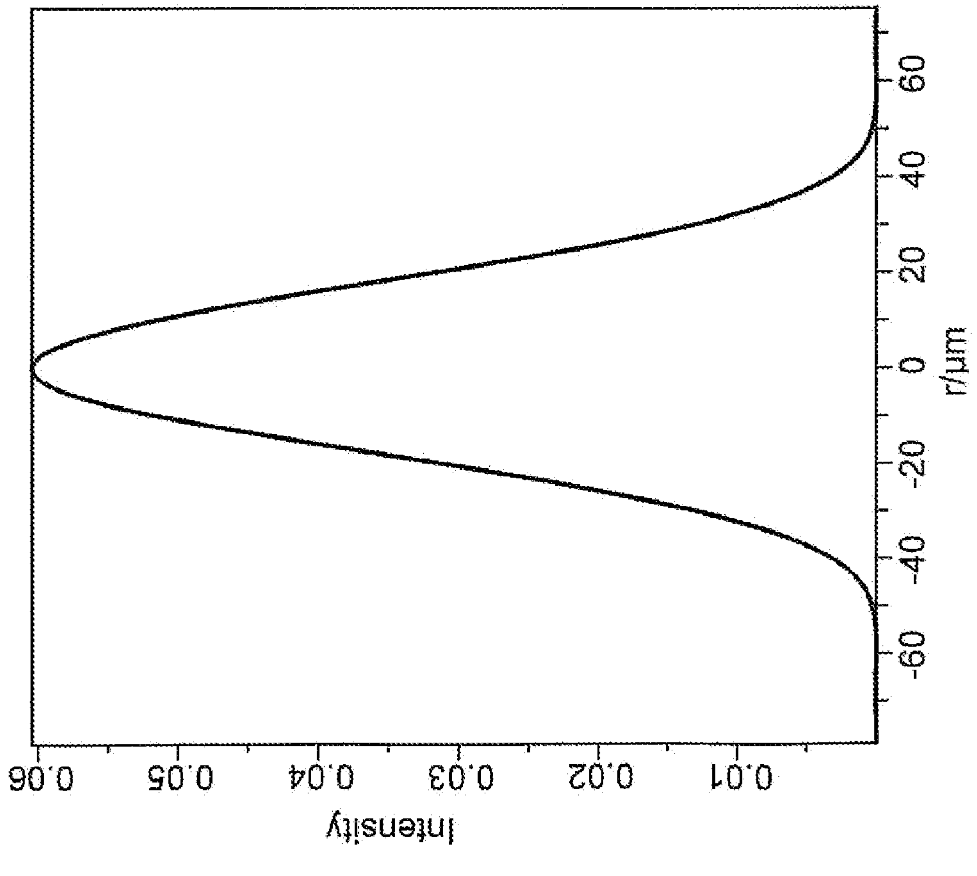

For the $LP_{08}$ mode FIGS. 7*a*, 7*b*, 8, 9*a* and 9*b* show, analogous to FIGS. 3*a*, 3*b*, 4, 6*a* and 6*b*, the intensity distributions in the near (FIG. 7*a*) and far field (FIG. 7*b*) without phase plate, with phase plate, but without filtering (FIG. 8) and with phase plate and optical filtering using a stop radius corresponding to again 0.019 rad (FIGS. 9*a* and 9*b*). The $M^2$ parameters are (see also the table above): $M^2$=13.99 for the original $LP_{08}$ mode, $M^2$=13.86 for the $LP_{08}$ mode plus phase plate, and $M^2$=1.04 for the converted and filtered beam by conserving 75.3% of the total light power. The simulation verifies, as it was shown generally in A. E. Siegman, "Binary phase plates cannot improve laser beam quality," Opt. Lett. 18, 675-677 (1993), which is incorporated herein by reference in its entirety, that a binary phase plate alone cannot improve the beam quality factor $M^2$, because now there are in the far field some small secondary maxima far away from the center (see FIG. 8). Although, the height of these secondary maxima is quite small, they are responsible for the high $M^2$ value because they are far away from the center and contribute therefore considerably to $\sigma_{\theta x}$ of equation (1). But, by filtering out the side lobes of the far field distribution, the $M^2$ value is nearly that of a fundamental Gaussian beam. Of course, this is at the expense of losing some light power.

All simulations were also repeated for a second set of modes for a fiber which was designed for a wavelength of λ=1550 nm. The results which have a similar behavior as for the fiber at 1080 nm wavelength are given in a table below.

| | Mode | | | | | | |
|---|---|---|---|---|---|---|---|
| | $LP_{02}$ | $LP_{03}$ | $LP_{04}$ | $LP_{05}$ | $LP_{06}$ | $LP_{07}$ | $LP_{08}$ |
| | Original beam | | | | | | |
| $M^2$ | 2.26 | 4.56 | 6.58 | 8.49 | 10.35 | 12.18 | 14.01 |
| $A_{eff}$ (μm²) | 3966 | 3467 | 3152 | 2891 | 2655 | 2430 | 2220 |
| | Beam with phase plate (but without filtering) | | | | | | |
| $M^2$ | 2.26 | 4.54 | 6.56 | 8.44 | 10.29 | 12.09 | 13.87 |
| | Beam with phase plate and filtering | | | | | | |
| $M^2$ | 1.07 | 1.05 | 1.05 | 1.05 | 1.05 | 1.04 | 1.04 |
| $P/P_0$ | 84.3% | 77.6% | 76.7% | 76.4% | 76.2% | 76.1% | 76.1% |
| $A_{eff}$ (μm²) | 4046 | 4199 | 4195 | 4199 | 4222 | 4268 | 4360 |

The results of the previous two tables show both that the $LP_{02}$ mode can be converted to a nearly fundamental Gaussian beam with high efficiency concerning the conserved amount of light power $P/P_0$. However, all higher order modes (m>2) can be converted to a fundamental Gaussian beam with nearly the same efficiency $P/P_0$. Only the $LP_{03}$ mode has a little bit higher efficiency $P/P_0$ than the others, but considerably smaller as that of the $LP_{02}$ mode. The tables also show that the effective areas $A_{eff}$ of the converted modes after filtering are nearly constant for all mode orders with some exception of the $LP_{02}$ mode. Only, for the higher order modes at λ=1550 nm there is a small increase of the effective areas for the mode orders 6 to 8. Moreover, the effective areas of the converted modes are a little bit larger than the effective area of the original $LP_{02}$ mode.

Next, the sensitivity of the phase plate against misalignments and fabrication errors was investigated. For this purpose three tolerances are regarded:

a) Lateral misalignment of the phase plate relative to the fiber core
b) Axial misalignment of the phase plate relative to the fiber end (simulation of the free-space propagation between fiber and phase plate using the angular spectrum of plane waves method)
c) Variation of the phase shift of the phase plate, i.e. either variation of the etching depth of the fiber (or the refractive index) or variation of the wavelength of the mode.

A table below lists the $M^2$ factors and the amount of conserved light power for the different tolerances in the case of the $LP_{08}$ mode at λ=1080 nm. The $LP_{08}$ mode is taken because it should be the most sensitive one because of the smallest feature sizes in the intensity distribution compared to modes with lower order. Hereby, it is assumed that the stop in the filtering telescope and the telescope itself are exactly aligned relative to the fiber. This means that only the phase plate has some tolerances, either in the positioning or in the fabrication.

10*a*, 10*b* and 10*c*. There are in all cases nearly parabolic dependence between the tolerance parameters and the conserved light power. In the case of the variation of the phase shift of the phase plate it has to be mentioned that there are in practice three parameters (or in practice two because the small variation of the refractive index n can be neglected in most cases) which can generate a variation of the phase shift. The phase shift ΔΦ of the phase plate has the following dependence:

$$\Delta\Phi = \frac{2\pi}{\lambda}(n-1)d \tag{3}$$

Figure 10A:
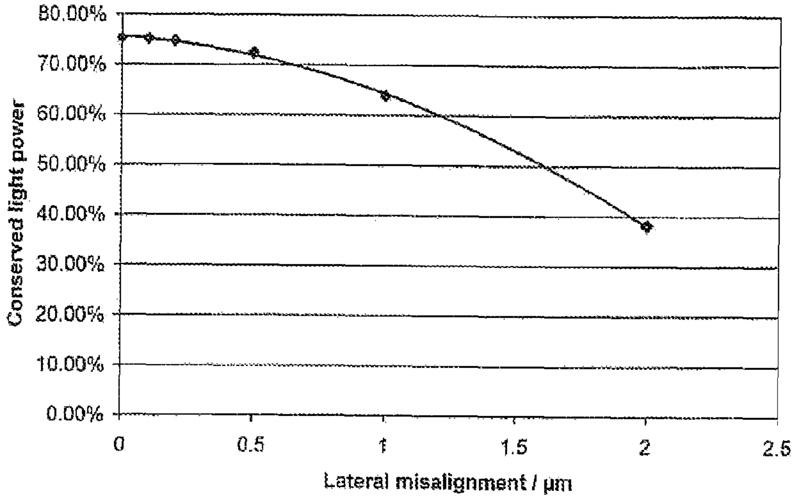
FIGS. 10*a*, 10*b* and 10*c* are tolerance analyses for an $LP_{08}$ mode at $\lambda$=1080 nm which show conserved light power as function of a lateral misalignment of a phase plate, conserved light power as function of an axial misalignment of the phase plate, and conserved light power as function of a phase shift of the phase plate, respectively.
Figure 10B:
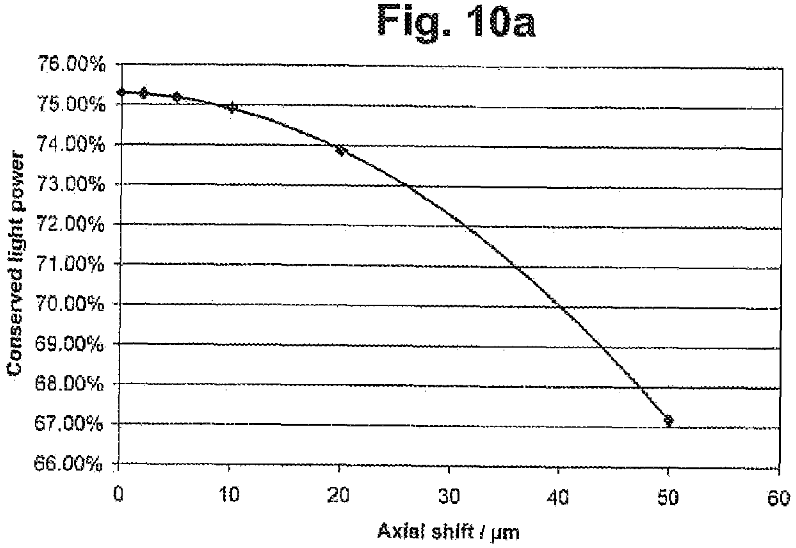
Figure 10C:
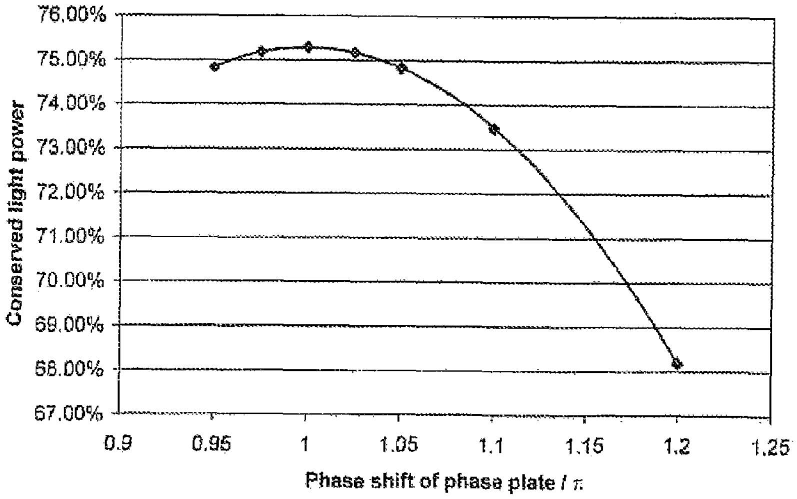

Here, n is the refractive index of the phase plate which is assumed to have air as surrounding medium. d is the etching depth of the binary structures of the phase plate. Since the phase plate should generate ideally a phase shift of π, there is for a given wavelength λ an ideal etching depth $d_{ideal}=\lambda/(2(n-1))$. In practice, the wavelength of the higher order modes is allowed to vary by about ±50 nm around the design wavelength because of the broad allowed bandwidth of these fibers. For a design wavelength of λ=1080 nm this would mean a variation of the phase shift of the phase plate between about 0.95π and 1.05π. So, according to FIG. 10*c* or the above table less than 0.5% of the total light power will get lost by varying the wavelength between 1030 nm and 1130 nm. Of course, a change of the wavelength would also mean a lateral stretching or compression of the far field intensity distribution by a factor of Δλ/λ if the near field intensity distribution is not changed. So, first of all the diameter of the stop in the filtering telescope should be changed accordingly by a factor Δλ/λ. However, since the stop in the filtering telescope has a radius which is almost identical to the radius of the minimum of the central intensity peak (see FIGS. 8 and 9*b*), a small variation of the size of the central intensity peak will have almost no

| Lateral misalignment | | | | | | |
|---|---|---|---|---|---|---|
| | Δx = 0 μm | Δx = 0.1 μm | Δx = 0.2 μm | Δx = 0.5 μm | Δx = 1 μm | Δx = 2 μm |
| $M_x^2$ | 1.04 | 1.04 | 1.04 | 1.04 | 1.04 | 1.12 |
| $M_y^2$ | 1.04 | 1.04 | 1.04 | 1.04 | 1.05 | 1.18 |
| $P/P_0$ | 75.29% | 75.17% | 74.78% | 72.29% | 63.80% | 38.12% |

| Axial misalignment | | | | | | |
|---|---|---|---|---|---|---|
| | Δz = 0 μm | Δz = 2 μm | Δz = 5 μm | Δz = 10 μm | Δz = 20 μm | Δz = 50 μm |
| $M^2$ | 1.04 | 1.04 | 1.04 | 1.04 | 1.06 | 1.17 |
| $P/P_0$ | 75.29% | 75.27% | 75.17% | 74.93% | 73.87% | 67.17% |

| Influence of phase shift of the phase plate | | | | | | | |
|---|---|---|---|---|---|---|---|
| ΦΔ | 0.95π | 0.975π | 1π(ideal) | 1.025π | 1.05π | 1.1π | 1.2π |
| $M^2$ | 1.04 | 1.04 | 1.04 | 1.04 | 1.04 | 1.04 | 1.04 |
| $P/P_0$ | 74.83% | 75.18% | 75.29% | 75.18% | 74.83% | 73.47% | 68.18% |

It can be seen that in all cases the $M^2$ parameter does not change significantly. This is of course due to the filtering in the telescope. But, the conserved amount of light power changes in some cases dramatically because in the case of misalignments some light power is absorbed at the filtering stop. Therefore, the dependence of the conserved light power on the different tolerances are shown graphically in FIGS.

influence. So, also without a variation of the stop size in the filtering telescope the results of the table above and FIG. 10*c* will be obtained with good approximation if the wavelength is changed by only ±50 nm.

In total, it can be clearly seen that the most critical misalignment parameter is a lateral misalignment of the fiber core relative to the phase plate. The amount of conserved light power is very sensitive to lateral misalignments of the phase plate, so that just a lateral misalignment of less than 1 μm can be accepted. Therefore, it is either necessary to have a very accurate positioning stage for the phase plate or it is necessary to form a magnified image of the wave front at the fiber end with the help of a beam expander telescope or another optical device. Other misalignments, like a tilt of the phase plate relative to the fiber end, will not have a significant effect. A tilt by an angle $\theta$ causes for example a locally dependent axial misalignment by $r\theta$ (r is the lateral distance from the optical axis), a change of the effective etching depth by a factor of $1/\cos\theta$, and an elliptic deformation of the effect of the phase plate by a factor of $\cos\theta$. But, for a typical value of $\theta=1°$ all these misalignments can be neglected.

As mentioned before, the allowed tolerances of the phase plate can be increased by using an optical imaging system between the fiber end and the phase plate so that the wave front is laterally magnified by a factor $|\beta|>1$.

Figure 7B:
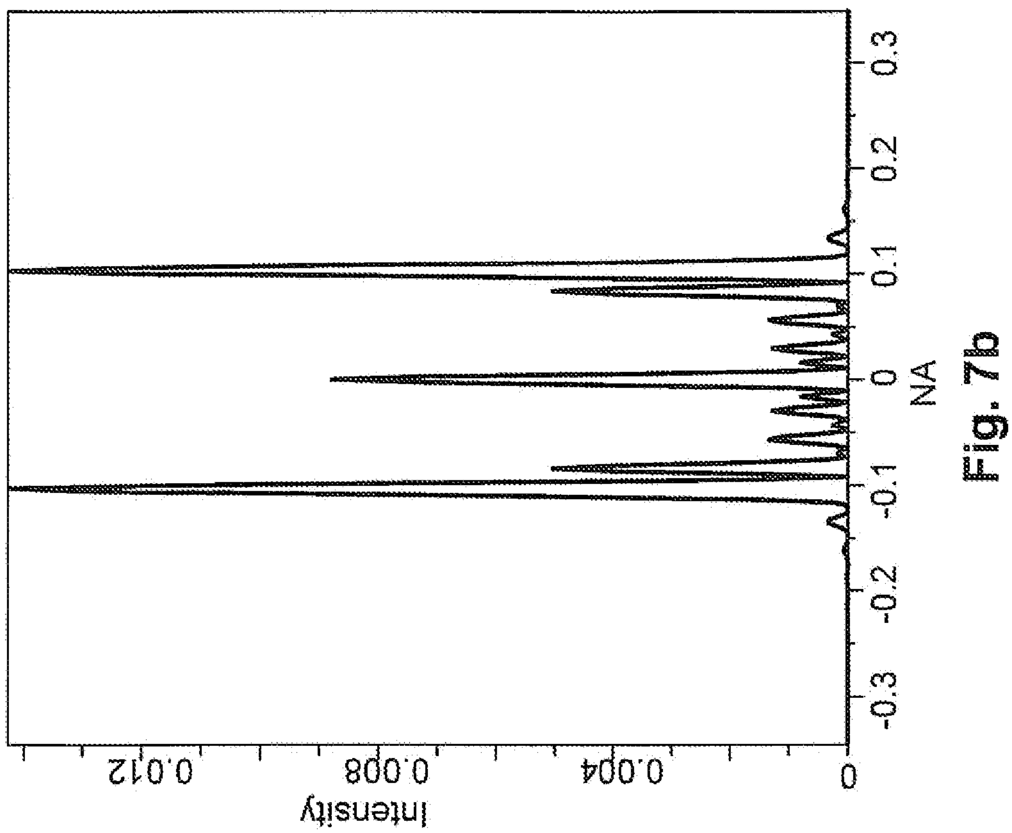
FIGS. 7*a* and 7*b* are intensity distributions of an $LP_{08}$ mode at $\lambda$=1080 nm in a near field and a far field, respectively.
Figure 7A:
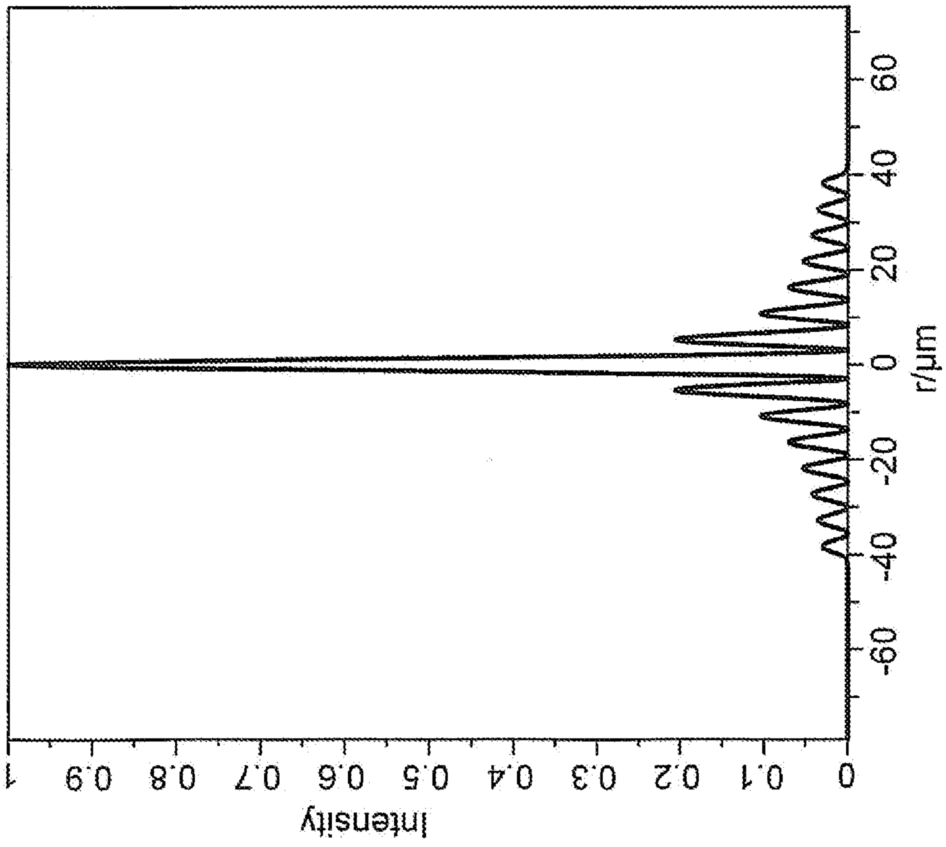
Figure 8:
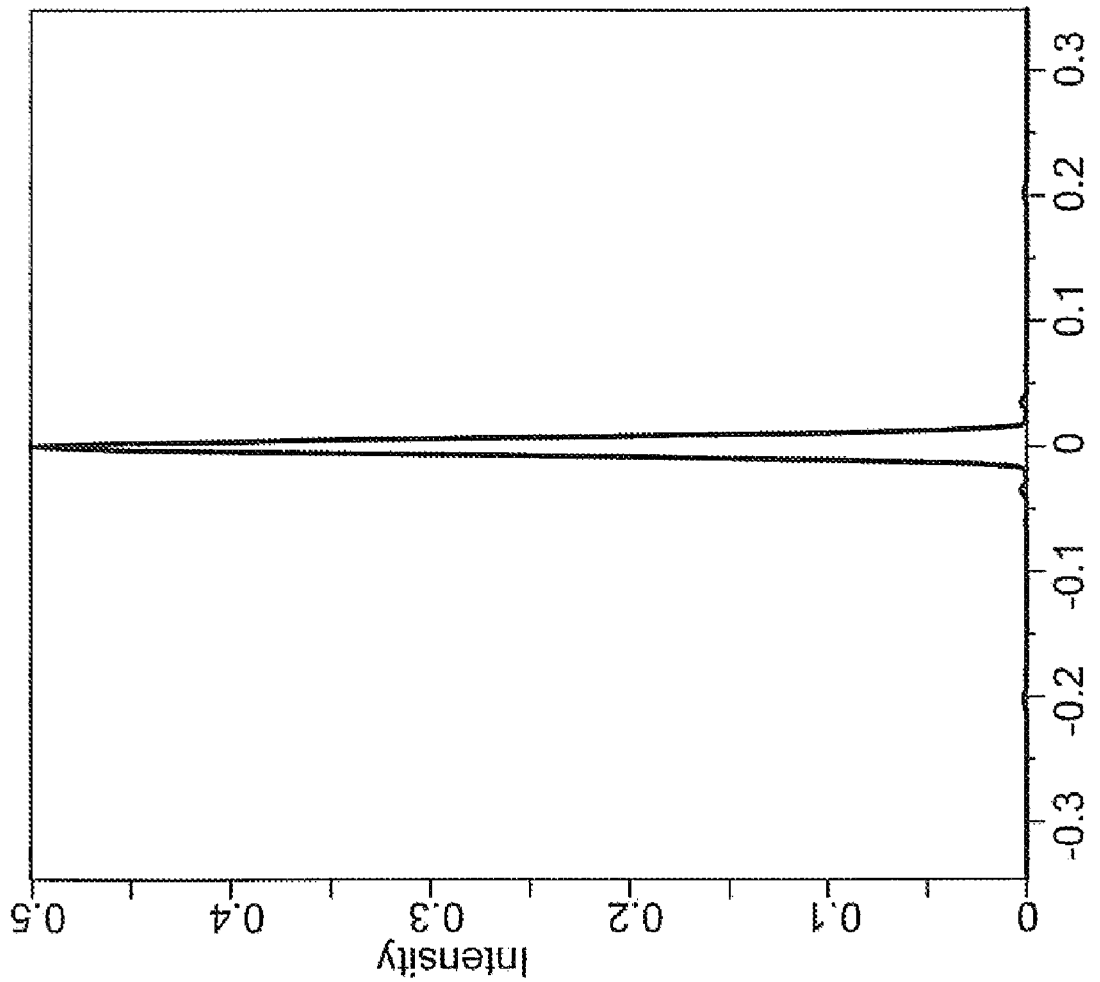
FIG. 8 is a far field intensity distribution of an $LP_{08}$ mode at $\lambda$=1080 nm with a phase plate immediately behind a fiber.

By using a telescope, a magnified image of the wave front can be Conned without changing the shape of the wave front itself. However, the telescope must image the whole wave front without any aberrations. In FIGS. 3*b* and 7*b*, the far field intensity distributions of the $LP_{02}$ and $LP_{08}$ modes are shown without a phase plate. So, it can be seen that most of the light is in a ring with an angle corresponding to a numerical aperture (NA) of about 0.1 and that also some light is outside of this ring up to a NA of about 0.2. So, the telescope has to image at least an object with an input numerical aperture of 0.2 without aberrations. So, it may not be sufficient to use a standard beam expander or to build a telescope by using standard achromatic doublets (which are not used because of their achromatic correction, but because they also fulfill the sine condition) as it is usually done in optics. But, by using a microscope objective with NA≧0.2 as first telescope lens and an achromatic doublet as second lens, a telescopic system with the required specifications can be built.

Figure 11:
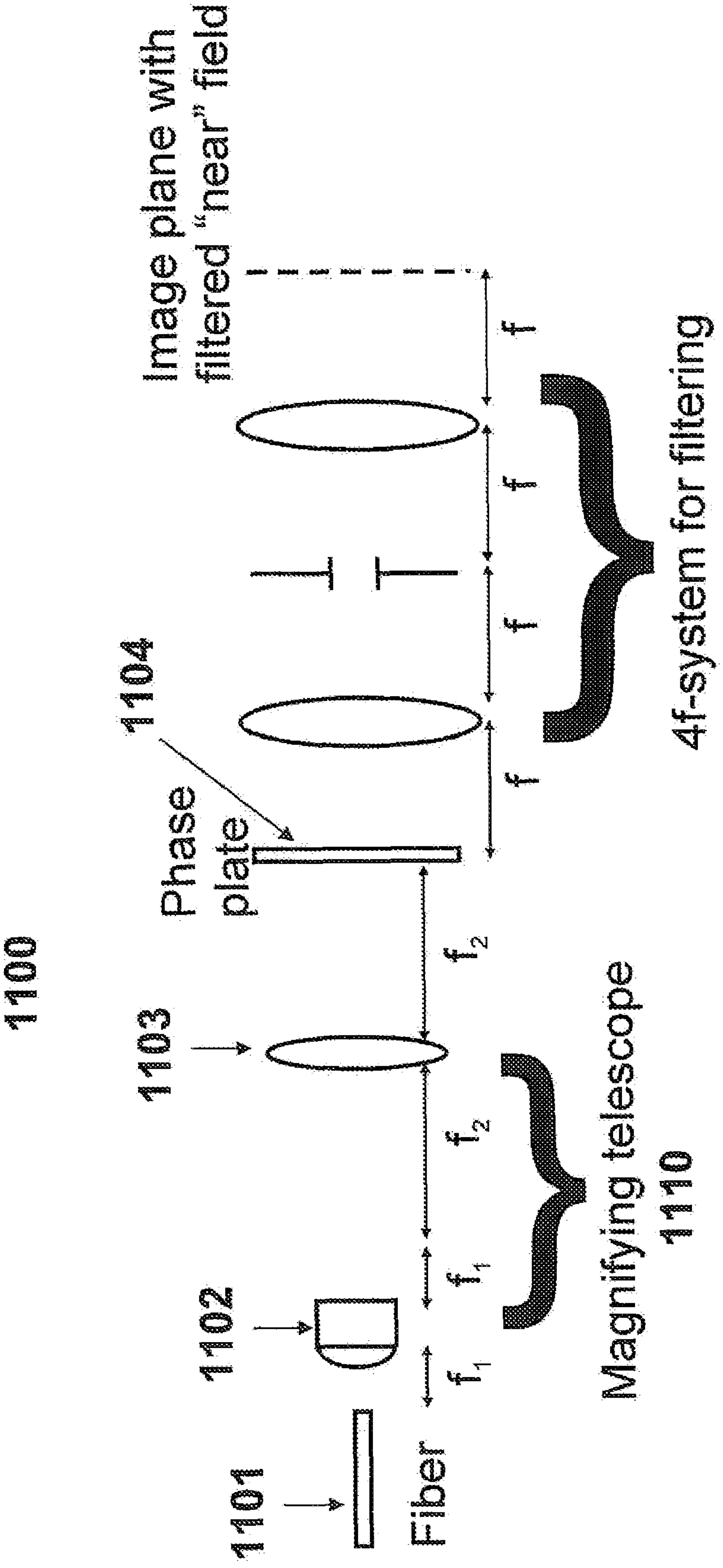
FIG. 11 illustrates an exemplary apparatus for performing mode conversion by using optical lenses.

FIG. 11 illustrates an exemplary apparatus 1100 that may be used to practice mode conversion. This exemplary apparatus 1100 has a magnifying telescope system 1110 prior to a phase plate 1104 to magnify the image of a higher order mode. A magnified image of the wave front is formed at the phase plate 1104 end. The magnification is done using a magnifying telescope system 1110 as a beam expander.

In this embodiment, a telescope system, which comprises a first lens 1102 and a second lens 1103, was used as a beam expander. The first lens 1102 is a microscope objective with NA≧0.2 and the second lens 1103 is an achromatic doublet. In this configuration, the telescope can image the whole wave front without aberrations. The first lens 1102 and the second lens 1103 are located so that the image of higher-order modes is magnified by at least a factor of two. Note that the second lens 1103 can be substituted with other lenses which fulfill the sine condition.

If the telescope magnifies the wave front by a factor of $\beta(|\beta|>1)$, the lateral misalignment of the phase plate can also be increased by a factor $|\beta|$ in order to have the same values for $M^2$ and the conserved light power as for the miniaturized phase plate optically connected to the fiber end without using a beam expander telescope. Such optical connection can be established in different ways such as by holding the different components in close contact or splice them together. The allowed axial misalignment tolerance is even increased by a factor of $\beta^2$ by using the telescope. Of course, by using a telescope with a magnification of $\beta$ the lateral extension of the rings of the phase plate has also to be magnified by $|\beta|$. So, the radii values of the phase plate for converting for example the $LP_{08}$ mode (see $1^{st}$ table) have to be magnified by $|\beta|$. Therefore, the fabrication of the phase plate should also be easier. On the other side, the beam expander telescope may also be a source of error if for example the scaling factor $\beta$ is in practice different from the value which is used in the design of the phase plate. Then, there is a kind of radial shear between the wave front and the phase plate.

It should also be mentioned that the requirements on the numerical aperture of the filtering telescope are not as severe as on the magnifying telescope, even if no magnifying telescope is used to save optical elements or money (of course on the costs of a very tight lateral misalignment tolerance of the phase plate). This can be clearly seen by looking at FIGS. 4 and 8. There, the central peak is quite narrow corresponding to a numerical aperture of only about 0.02. A binary phase plate without spatial filtering does not remove side lobes. However, a filtering telescope behind the phase plate removes those side lobs and a numerical aperture of less than 0.05 for such filtering telescope is sufficient. If a magnifying telescope is used between the fiber and the phase plate, the requirements on the numerical aperture of the filtering telescope are decreased again by a factor $1/|\beta|$.

One can also think about other possibilities for magnifying the wave front in order to have more tolerance for the phase plate. First of all, it is not really necessary to have a telescopic imaging of the wave front, but it is also possible to take a "normal" lens for imaging. There is then an additional spherical wave front curvature in the image plane which has to be compensated by the optics of the filtering telescope or some additional optics. So, a telescopic imaging is preferable, but not really necessary.

A graded index (GRIN) lens could for example be spliced to the fiber, and then the phase plate can be spliced to the GRIN lens, so that a very compact device is generated. However, a simple paraxial analysis of GRIN lenses shows, that using a single GRIN lens as an imaging device without a free space distance in front of and behind the GRIN lens is only possible for a scaling factor of ±1. The argument just uses the paraxial ray transfer matrix M of a GRIN lens which connects a paraxial ray with height x and angle $\phi$ directly at the front plane of the GRIN lens with the paraxial ray with height x' and angle $\phi'$ directly at the back plane of the GRIN lens with length z and refractive index distribution $n(r)=n_0-n_1r^2$:

$$\begin{pmatrix} x' \\ \varphi' \end{pmatrix} = M\begin{pmatrix} x \\ \varphi \end{pmatrix} \text{ with } M = \begin{pmatrix} A & B \\ C & D \end{pmatrix} = \begin{pmatrix} \cos\alpha & f\sin\alpha \\ -\frac{\sin\alpha}{f} & \cos\alpha \end{pmatrix} \quad (4)$$

$$\text{and } \alpha = \sqrt{\frac{2n_1}{n_0}}\,z;\ f = \frac{1}{\sqrt{2n_0n_1}}$$

Here, $n_0$ is the refractive index of the GRIN lens in the center and $n_1$ describes the change of the refractive index with the radial coordinate r. f is the focal length of the GRIN lens.

To have imaging between the back and front plane of the GRIN lens the matrix coefficient B has to be zero because then the position x' of the rays contributing to the image point is independent of the ray angle $\phi$. In this case, A is the lateral magnification such that $A=\beta$. But, B=0 requires $\sin\alpha=0$, and $\beta=A=\cos\alpha=\pm1$. Such GRIN lenses with $\sin\alpha=0$, i.e. $\alpha=m\pi$ and an integer number m, are called "half pitch" lenses or "full pitch" lenses because the light in the GRIN lens, which follows a sinusoidal path, makes them half of a period ($\alpha=\pi$) or a full period ($\alpha=2\pi$).

But, of course a scaling factor $|\beta|>1$ is needed. So, there has to be free space propagation in front of and behind the GRIN lens if it is used as magnifying lens. This can also be done in glass so that for example a small glass rod can be spliced to the fiber, and then the GRIN lens spliced to the glass rod, and so on. For those embodiments, the diameter of the glass rod has to be much larger than the fiber diameter to have real free space propagation without guidance of the modes. So, in total the solution with a single GRIN lens is also not so easy because a quite accurate adjustment of the air gaps or lengths of the glass rods are required.

Besides, aberrations of a GRIN lens for off-axis points have to be taken into account. Some simulations were made using a GRIN lens with a refractive index distribution of $$n(r) = n_0\operatorname{sech}(\mathrm{gr}) = \frac{n_0}{\cosh(\mathrm{gr})} = \frac{2n_0}{\exp(\mathrm{gr}) + \exp(-\mathrm{gr})} \text{ with } g = \sqrt{\frac{2n_1}{n_0}} \quad (5)$$

which is the ideal refractive index distribution for non-paraxial imaging in the case of scaling factor $|\beta|=1$. Here, $n_0$ and g are the two material parameters of the GRIN lens.

Figure 12A:
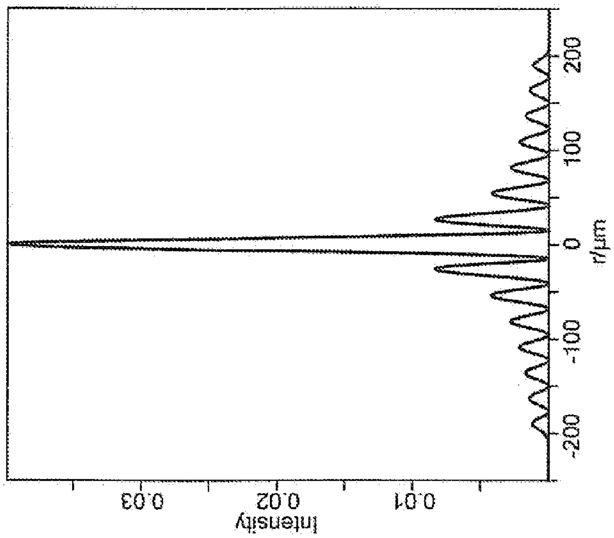
FIGS. 12*a*, 12*b* and 12*c* show non-telescopic imaging of an $LP_{08}$ mode at $\lambda$=1080 nm with a single graded index (GRIN) lens and free space propagation in air which show an intensity distribution in an image plane, phase in the image plane, and an intensity plot (logarithmic scale) showing a light propagation from a object plane (bottom) to the image plane (top), respectively.
Figure 12B:
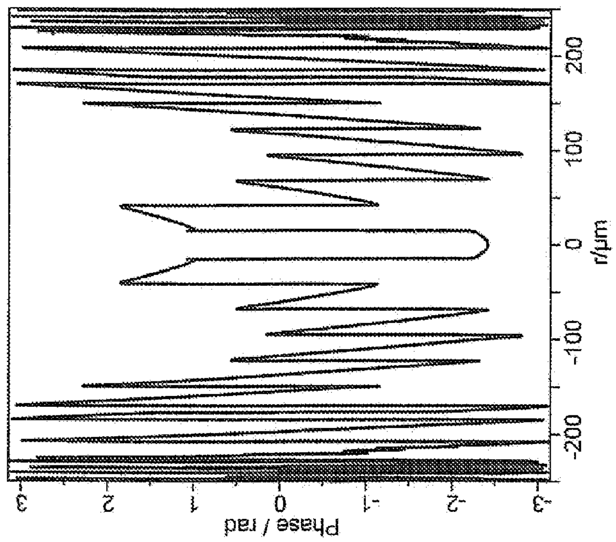
Figure 12C:
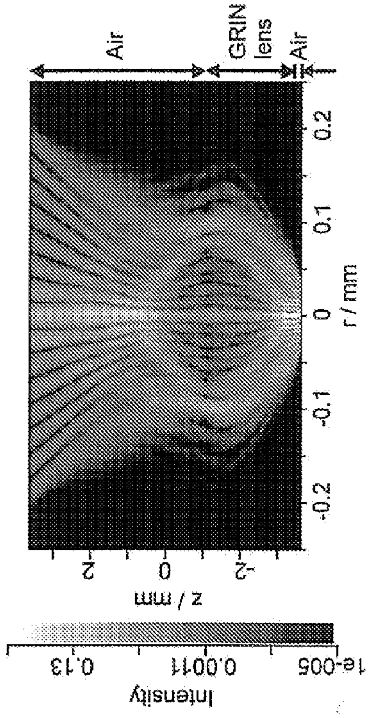

A scalar beam propagation method was used to simulate the propagation of the $LP_{08}$ mode at $\lambda=1080$ nm through a GRIN lens with a length of z=2.4 mm, $n_0=1.6289$ and $n_1=0.3484\ \mathrm{mm}^{-2}$. Such a GRIN lens with $\alpha=\pi/2$ is called a "quarter pitch" lens. The scaling factor was in this case $\beta=-5$, which means that the distance between the fiber and the front plane of the GRIN lens has to be 0.188 mm (in air). The distance between the back plane of the GRIN lens and the image plane is then 4.69 mm (also in air). FIG. 12*a* shows the intensity distribution in the image plane and FIG. 12*b* shows the phase in the image plane. Finally, FIG. 12*c* illustrates how the light propagates along the optical axis. It can be seen that the $LP_{08}$ mode is imaged quite well by the GRIN lens by comparing the results with FIG. 7*a*. By comparing the peak-to-valley values (P/V) of both plots, it is verified that the P/V of the intensity of the image is decreased by a factor of $1/\beta^2=0.04$, as expected. But, looking at FIG. 12*b* it can also be seen that there is now a parabolic phase term added, whereas the original $LP_{08}$ mode just had phase jumps of $\pi$ at the zeros of the intensity and besides this a plane wave front.

It should also be mentioned that by using one GRIN lens alone only a non-telescopic imaging can be obtained if a scaling factor $|\beta|\neq1$ is required. A telescopic imaging with a GRIN lens is only possible with scaling factor $\beta=\pm1$ as can also easily be shown using the GRIN tens matrix of equation (4) and multiplying it with two free space propagation matrices:

$$M' = \begin{pmatrix} A' & B' \\ C' & D' \end{pmatrix} = \begin{pmatrix} \cos\alpha - \frac{d_2}{f}\sin\alpha & d_1\cos\alpha + f\sin\alpha + d_2\cos\alpha - \frac{d_1 d_2}{f}\sin\alpha \\ -\frac{1}{f}\sin\alpha & \cos\alpha - \frac{d_1}{f}\sin\alpha \end{pmatrix} \quad (6)$$

Here, $d_1$ is the propagation distance from the object plane (fiber end) to the GRIN lens and $d_2$ the distance from the GRIN lens to the image plane (phase plate). For a telescopic imaging both the coefficients B' and C' have to be zero. But, C'=0 requires again sin $\alpha=0$ (or the trivial solution 1/f=0 meaning no GRIN lens at all and therefore no imaging) and therefore $\beta=A'=\cos\alpha=\pm1$.

Figure 13:
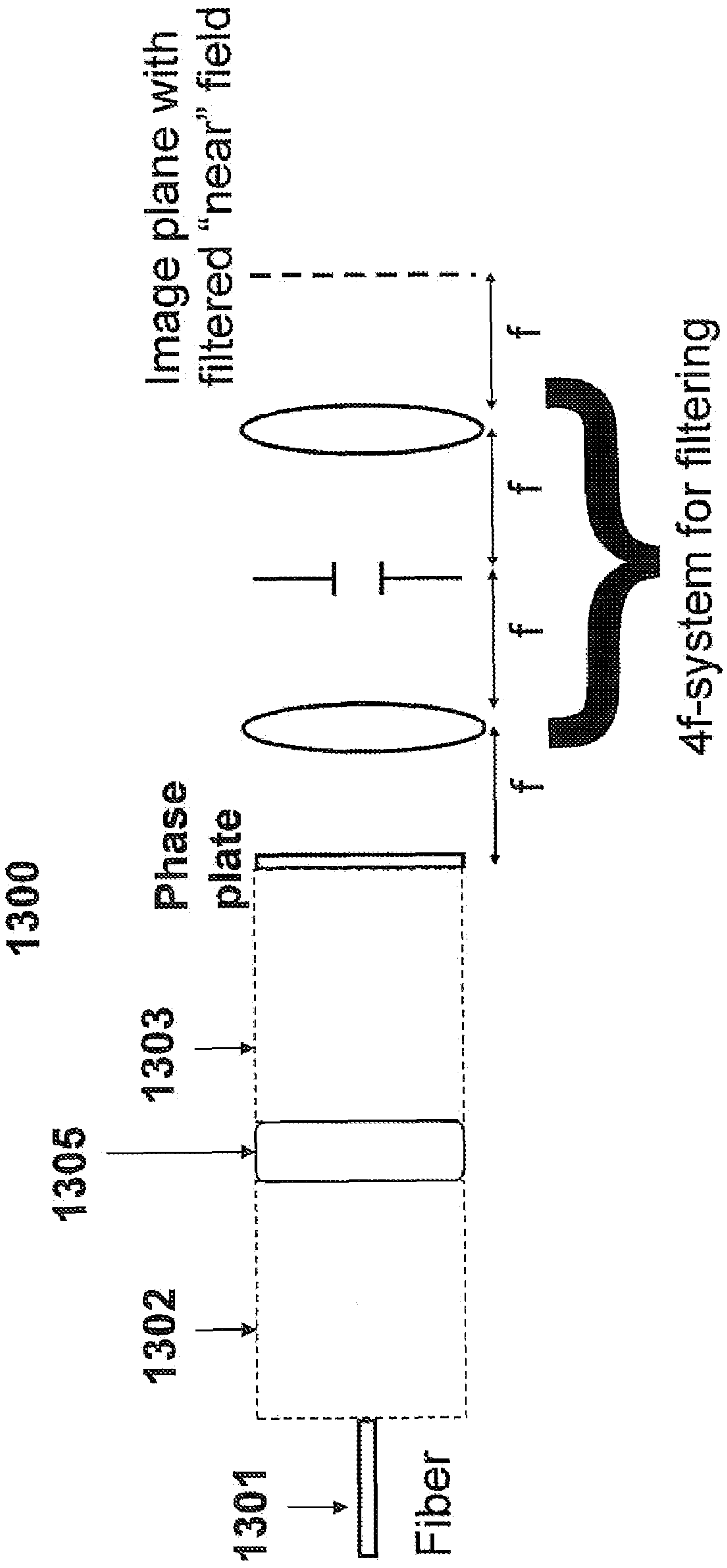
FIG. 13 illustrates an exemplary apparatus for performing mode conversion by a GRIN lens with a free-space propagation region immediately before and after the lens.

In another embodiment in FIG. 13, an exemplary apparatus 1300 uses a GRIN lens as a beam expander. A fiber 1301 is followed by a first free-space propagation region 1302 of a predetermined distance, followed by a GRIN lens 1305, which is then followed by a second free-space propagation region 1303 of another predetermined distance. The two free-space propagation distances 1302 and 1303 are adjusted to magnify the mode at the output of the fiber by at least a factor of two. The free space propagation areas 1302 and 1303 can be air gaps or glass rods. The diameters of the glass rods are selected so that free space propagation without guidance of the modes can be achieved.

Figure 14B:
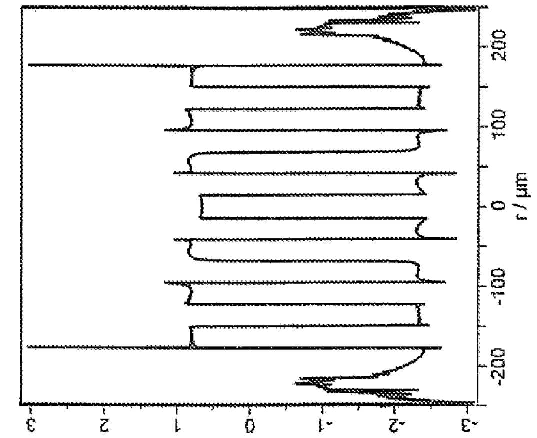
FIGS. 14*a*, 14*b* and 14*c* show telescopic imaging of an $LP_{08}$ mode at $\lambda$=1080 nm with a GRIN lens telescope having two different GRIN lenses which show an intensity distribution in an image plane, phase in the image plane, and an intensity plot (logarithmic scale) showing a light propagation from an object plane (bottom) to the image plane (top), respectively.
Figure 14A:
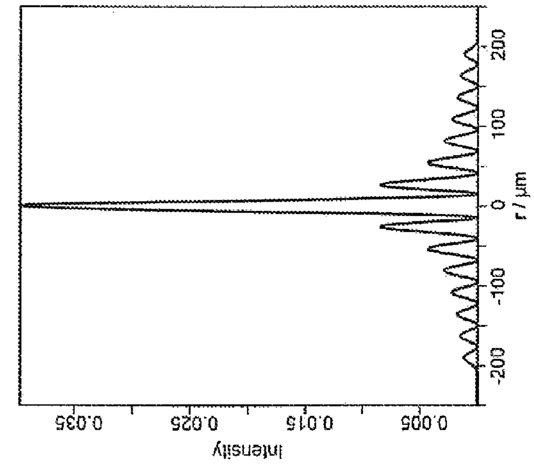
Figure 14C:
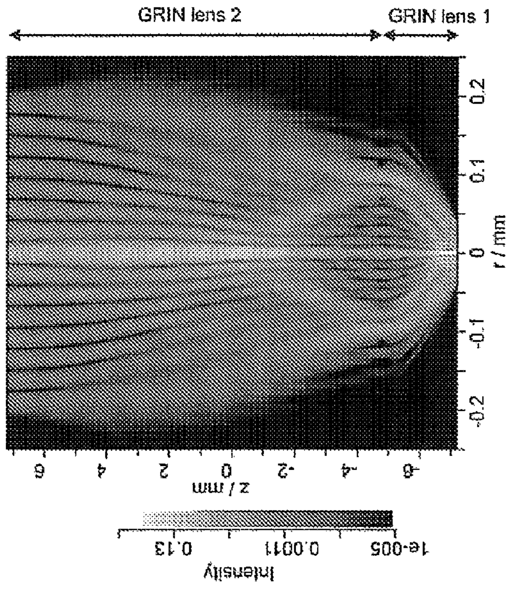

Of course, it is possible to build a telescope by two "quarter pitch" GRIN lenses with different focal lengths $f_1$ and $f_2$, and therefore different material parameters $n_1$ of the GRIN lenses. Then, the object plane (fiber end) can be directly in front of the first GRIN lens and the image plane (phase plate) directly behind the second GRIN lens, so that all can be optically connected together without propagation in air. FIG. 14*a* shows the intensity distribution in the image plane of such a GRIN lens telescope using two GRIN lenses with $z_1=2.4$ mm, $n_{0,1}=1.6289$, $n_{1,1}=0.3484\ \mathrm{mm}^{-2}$ and $z_2=12$ mm, $n_{0,1}=1.6289$, $n_{1,2}=0.0140\ \mathrm{mm}^{-2}$. According to equation (4) the focal lengths are therefore $f_1=0.94$ mm and $f_2=4.68$ mm, so that a scaling factor of $\beta=-5$ results for the telescopic imaging. FIG. 14*b* shows the phase in the image plane. Finally, FIG. 14*c* shows the light propagation along the optical axis in this case. Again, the $LP_{08}$ mode is imaged very well and magnified laterally by a factor $|\beta|=5$. Additionally, now also the phase is nearly unchanged besides the lateral magnification by a factor of 5 and there is no free space propagation in air. So, a quite compact telescopic imaging system can be built by optically connecting the two GRIN lenses to the fiber and finally the phase plate to the GRIN lenses. The grooves of the phase plate have to be filled with air and not with optical glue, so that the phase plate works properly.

Figure 15:
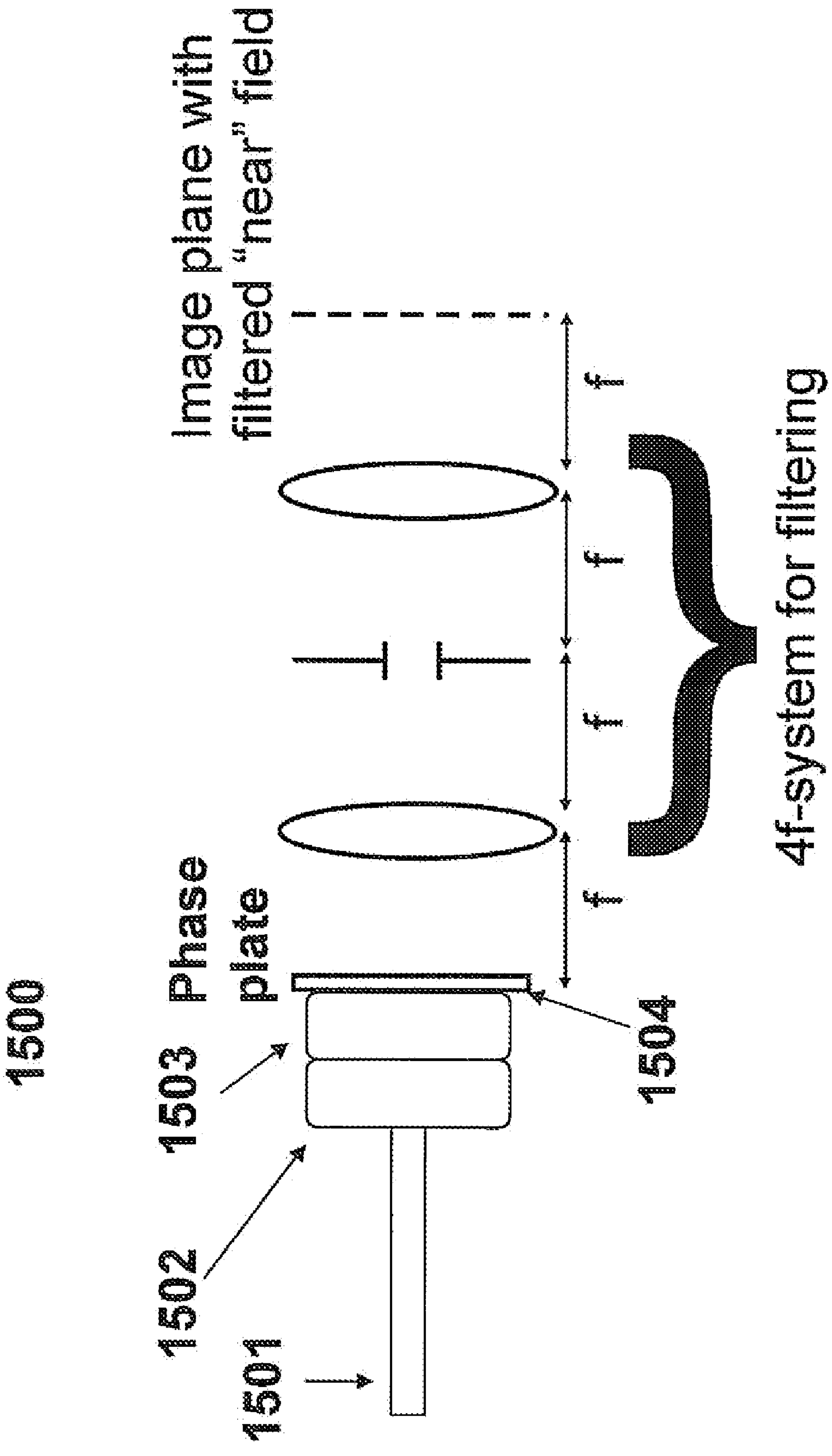
FIG. 15 illustrates an exemplary apparatus for performing mode conversion by using two GRIN lenses with different focal lengths optically connected together.

In yet another embodiment in FIG. 15, an exemplary apparatus 1500 uses two "quarter pitch" GRIN lenses with different focal lengths as a beam expander. The first GRIN lens 1502 is optically connected to one end of a fiber 1501 that propagates higher-order modes, and the second GRIN lens 1503 is optically connected onto the front of a phase plate 1504. Also, the first and second GRIN lenses 1502 and 1503 are optically connected. The focal lengths of the first and second GRIN lenses 1502 and 1503 are selected so that the image of the higher-order modes is magnified by at least a factor of two as compared to the original image.

Of course, in practice the GRIN lenses may have some aberrations because the refractive index distribution in a real GRIN lens may deviate from equation (5).

While various embodiments of the present invention have been described above, it should be understood that they have been presented by way of example, and are not intend to limit the applications of the presented invention. It will be apparent to persons skilled in the relevant art that various changes in form and detail may be made therein without departing from the spirit and scope of the invention. Thus, the present invention should not be limited by any of the above-described embodiments, but should be defined only in accordance with the following claims and their equivalents.

What is claimed is:

1. An apparatus for converting a higher-order mode into a nearly fundamental Gaussian shape, the apparatus comprising:

a beam expander arranged to magnify an image of the higher-order mode;

a phase plate in optical communication with the beam expander, the phase plate for converting the magnified image of the higher-order mode into the nearly fundamental Gaussian shape; and an optical filter system in optical communication with the phase plate, the optical filter system for filtering a side band of the nearly fundamental Gaussian shape.

2. The apparatus of claim 1, wherein the beam expander is a telescope, the telescope comprising a first lens and a second lens.

3. The apparatus of claim 2, wherein the first lens is a microscope objective with NA≧0.2, and the second lens is an achromatic doublet.

4. The apparatus of claim 3, wherein the first lens and the second lens are located so that the image of the higher-order mode is magnified by at least a factor of two.

5. The apparatus of claim 1, wherein the beam expander is a graded index (GRIN) lens.

6. The apparatus of claim 5, wherein the beam expander has free space propagation areas in front of and behind the GRIN lens.

7. The apparatus of claim 6, wherein the free space propagation areas are air gaps.

8. The apparatus of claim 7, wherein the GRIN lens is located so that the image of the higher-order mode is magnified by at least a factor of two.

9. The apparatus of claim 6, wherein the free space propagation areas are glass rods.

10. The apparatus of claim 9, wherein the diameters of the glass rods are selected so that free space propagation without guidance of modes can be achieved.

11. The apparatus of claim 10, wherein the GRIN lens and the glass rods are located so that the image of the higher-order mode is magnified by at least a factor of two.

12. The apparatus of claim 1, wherein the beam expander is a telescope, the telescope comprising a first and a second GRIN lenses, the first GRIN lens having a first focal length, the second GRIN lens having a second focal length, and the first focal length being different from the second focal length.

13. The apparatus of claim 12, wherein the front end of the first GRIN lens is optically connected to one end of a fiber, the back end of the first GRIN lens is optically connected to the front end of the second GRIN lens, and the back end of the second GRIN lens is optically connected to the front end of the phase plate.

14. The apparatus of claim 13, wherein the first focal length and the second focal length are selected so that the image of the higher-order mode is magnified by at least a factor of two.

15. The apparatus of claim 14, wherein the first and the second GRIN lenses are quarter pitched.

16. The apparatus of claim 13, wherein the fiber is a large-mode-area higher-order-mode fiber.

17. The apparatus of claim 1, further comprising an optical waveguide.

18. The apparatus of claim 17, wherein the optical waveguide is a large-mode-area higher-order-mode fiber.

19. The apparatus of claim 1, wherein the phase plate is a binary phase plate.

20. A method comprising the steps of:

magnifying an image of a higher-order mode;

converting the magnified image of the higher-order mode into a nearly fundamental Gaussian shape; and filtering a side band of the nearly fundamental Gaussian shape to reduce a quality factor to approximately 1.

21. The method of claim 20, the image of the higher-order mode is magnified by at least a factor of two.

* * * * *